United States Patent [19]
Gaukroger

[11] Patent Number: 5,194,711
[45] Date of Patent: Mar. 16, 1993

[54] CUTTING USING HIGH ENERGY RADIATION

[75] Inventor: Michael P. Gaukroger, Hampshire, England

[73] Assignee: Anstalt Gersan, Vaduz, Liechtenstein

[21] Appl. No.: 655,400

[22] PCT Filed: Aug. 15, 1989

[86] PCT No.: PCT/GB89/00941
§ 371 Date: Apr. 10, 1991
§ 102(e) Date: Apr. 10, 1991

[87] PCT Pub. No.: WO90/01391
PCT Pub. Date: Feb. 22, 1990

[30] Foreign Application Priority Data
Aug. 15, 1988 [GB] United Kingdom ............... 8819349
Aug. 15, 1988 [GB] United Kingdom ............... 8819351

[51] Int. Cl.⁵ ............................................. B23K 26/00
[52] U.S. Cl. ........................... 219/121.67; 219/121.75
[58] Field of Search ........................ 219/121.78, 121.74, 219/121.75, 121.84, 121.67, 121.72

[56] References Cited
U.S. PATENT DOCUMENTS

| | | | |
|---|---|---|---|
| 3,600,065 | 8/1971 | Law et al. ........................... | 350/46 |
| 3,965,328 | 6/1976 | Locke ........................... | 219/121 LM |
| 4,383,168 | 5/1983 | Luck, Jr. ........................... | 250/201 |
| 4,501,962 | 2/1985 | Luck, Jr. ........................... | 250/201 |
| 4,644,126 | 2/1987 | Schumacher ........................... | 219/121 ED |
| 5,043,553 | 8/1991 | Corfe et al. ........................... | 219/121.7 |
| 5,061,839 | 10/1991 | Matsuno et al. ........................... | 219/121.78 |
| 5,063,280 | 11/1991 | Inagawa et al. ........................... | 219/121.7 |

FOREIGN PATENT DOCUMENTS

| | | |
|---|---|---|
| 1244523 | 11/1988 | Canada . |
| 0055463 | 7/1982 | European Pat. Off. . |
| 1752846 | 12/1971 | Fed. Rep. of Germany . |
| 2658682 | 6/1978 | Fed. Rep. of Germany . |
| 2052369 | 1/1981 | United Kingdom . |
| 2076334 | 12/1981 | United Kingdom . |

Primary Examiner—C. L. Albritton
Attorney, Agent, or Firm—Kerkam, Stowell, Kondracki & Clarke

[57] ABSTRACT

In order to make a laser cut in a diamond (1), the diamond (1) is reciprocated transversely, the radiation is focussed onto the bottom of the cut (6) by a stationary focussing lens (4), and the radiation is passed to the focussing lens (4) by a mirror (3) which is reciprocated in the same direction as the diamond (1), thereby rocking the axis (5) of the beam below the lens (4). This increases the energy entering the cut and reduces the focal spot area projected on the cut wall, thus increasing the energy density of radiation on the inclined cut walls.

11 Claims, 3 Drawing Sheets

CUTTING USING HIGH ENERGY RADIATION

BACKGROUND OF THE INVENTION

The present application relates to a method of making a cut using high energy radiation the radiation usually being a laser beam. A blind groove or hole may be formed in the workpiece, or the workpiece may be cut or pierced right through. The invention has general applicability and in general terms, unnecessary material removal must be avoided as this slows down the cutting process; however, the invention is particularly applicable to gemstones, where it is especially important to avoid unnecessary material removal, and it is also necessary to avoid applying excessive thermal stress; in addition, a particular problem with gemstones such as diamonds is that usually only a small percentage of the radiation may be absorbed, so it is important that the coupling of the energy to the workpiece be as effective as possible.

In gemstones, the laser cutting can be referred to as forming a kerf (a groove, either for cleaving or for later sawing), or sawing (cutting right through). In other applications using jewels or gemstones, a blind hole or a through-hole may be formed in order to employ the stone as a bearing.

When sawing gemstones, normal practice is to form a V-section, which should be as narrow as possible to reduce weight loss. There is automatic machinery for benching out the V-shape (i.e. scanning the area formed by the length and width of the cut) and for refocusing the beam as the cut depth increases.

A fundamental problem is that the energy density in the focal spot should be as great as possible, but a smaller focal spot (and thus higher energy density) can only be obtained by increasing the cone angle of the focussed beam (i.e. high numerical aperture). The machined V-section has then to be wider, otherwide the laser energy focussed into the cut is apertured (vignetted) at the entrance to the cut as the depth increases.

THE INVENTION

According to the invention, the axis of the incident radiation relative to the cut is moved repeatedly from a position in which it is directed towards a first side of the cut and is inclined towards the other, second side of the cut to a position in which it is directed towards the second side of the cut and is inclined towards the first side of the cut, and back again.

The most intense part of the beam can be centered over the cut opening, reducing the effect of vignetting upon energy entering the cut by oscillating the beam.

In addition, the angle between the incident radiation and the side wall of the cut is increased, thereby reducing the size of the focal spot projected onto the side wall, and consequently increasing the energy density.

The technique is applicable for most laser types; although currently the preferred system for diamonds uses infra-red radiation of 1.064 nm from a Q-switched, neodymium-doped YAG laser, it is possible that frequency doubled YAG (532 nm), frequently quadrupled YAG (266 nm) and even shorter wavelength lasers such as ArF and KrF excimer lasers (193 nm and 248 nm wavelengths respectively) can be used. The technique is theoretically most beneficial with a Gaussian beam; in practice an advantage may be achieved using a near-Gaussian beam. One suitable system has a 10 mm expanded beam diameter and a focussing lens with a focal length of 50 mm.

Significant advantages can be obtained if the invention described herein is combined with the invention described in a patent application filed in August 1989 and entitled "Making an elongate cut using high energy radiation" and claiming priority from GB 88 19351.

THE DRAWINGS

The invention will be further described, by way of example, with reference to the accompanying drawings, in which.

FIGS. 1-3

Figure 1:
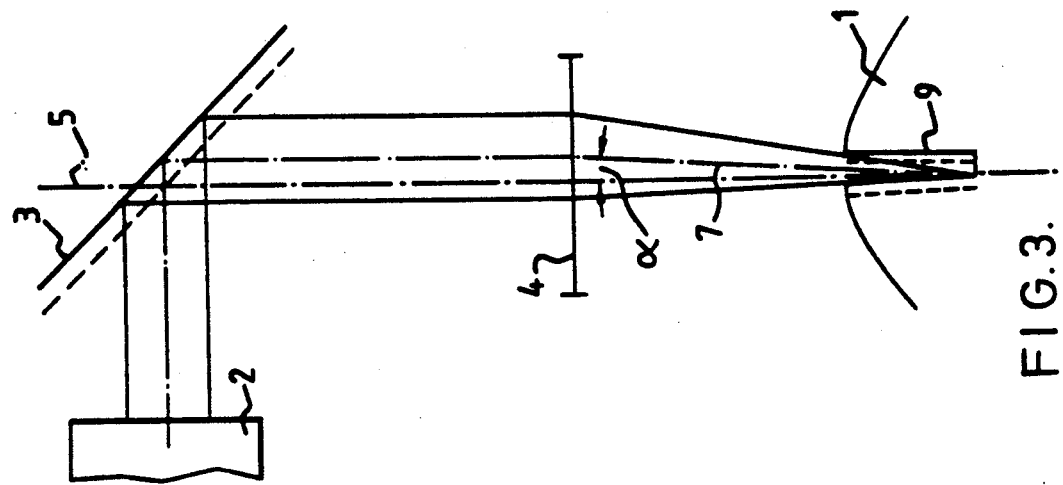
FIGS. 1 to 3 are three schematic views along the cut, illustrating the principle, and showing the beam below the lens respectively centered, cutting the right hand wall and cutting the left hand wall.
Figure 2:
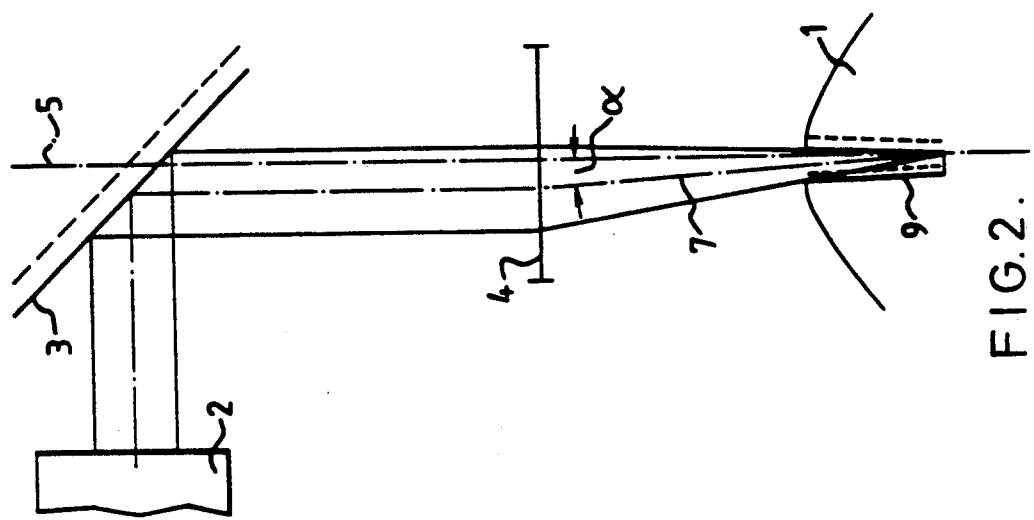
Figure 3:
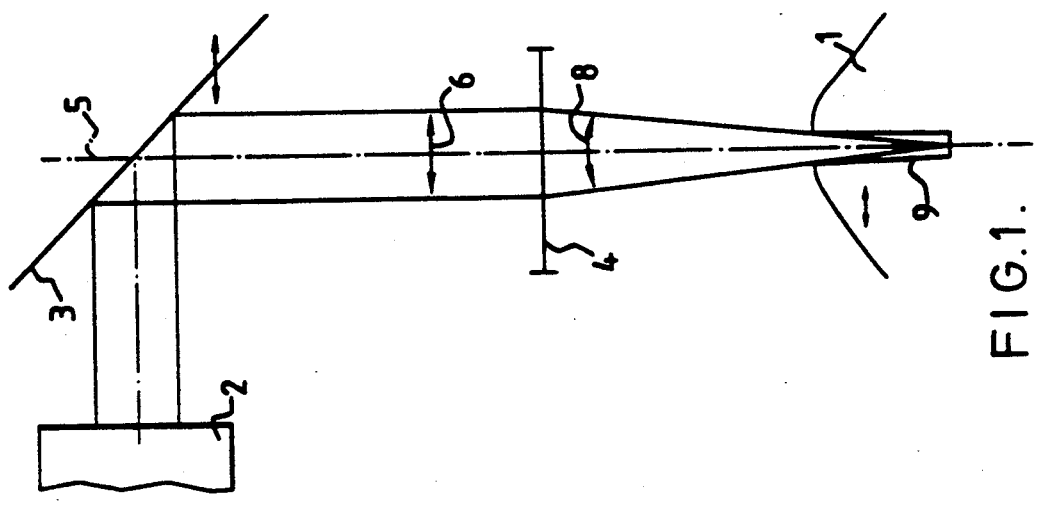

FIGS. 1 to 3 schematically show a diamond 1 which is being sawn using a laser with a beam expander 2, the optical system including a 45° mirror 3 and a focussing or objective lens 4. The diamond 1 is always machined on the optic axis 5 of the focussing lens 4, at the focal point. The double arrows in FIG. 1 indicate the movement of the mirror 3 and of the diamond 1, While the dashed lines in FIGS. 2 and 3 indicate the center positions of the mirror 3 and diamond 1 (i.e. as in FIG. 1). The diamond 1 is moved from side to side and the mirror 3 is translated so that the laser radiation entering the rear of the lens 4 is displaced in the sam direction as the diamond 1. The mirror 3 must be large enough to provide a reflective surface to the incident beam at all times. The lens 4 is held stationary and although the incident beam is still parallel to the optic axis 5 of the lens 4, the axis of the beam above the lens 4 is displaced from the center of the lens 4 (see the double arrow 6 in FIG. 1). In this way the axis 7 of the incident beam below the lens 5 is oscillated or 'rocked' about the focal point (see the double arrow 8 in FIG. 1), but the effective position of the focal point does not change. An advantage of this method of beam rocking is that there is no need to displace the diamond 1 in order to compensate for the fact that the beam is being rocked because the laser radiation is focussed to nominally the same position. However, the diamond 1 is moved to and fro transversely for benching out the cut.

The axis 5 is thus moved repeatedly from a position in which it is directed towards the left side of the cut 9 and is inclined towards the right side of the cut 9, to a position in which it is directed towards the right side of the cut 9 and is inclined towards the left side of the cut 9, and back again. The angle $2\alpha$ through which the axis 7 is rocked will depend on the desired inclination of the cut side walls, the instantaneous cut depth, the size of the stone 1 being sawn, and the geometry of the focussed beam, but is preferably an included angle of 10°. The stroke of the mirror 3 will depend upon the desired rocking angle and focal lens of the lens 4, but may be typically 5 mm. The rocking half angle $\alpha$ is shown as less than the half angle of the cone of rays, but it could be equal to or greater than the cone half angle.

There are other methods of oscillating the beam. For instance, the beam entering the rear of the lens 4 can be displaced by rotating a parallel-sided block of transparent material (e.g. glass or quartz) in the radiation between the laser and the lens 4. Other beam rocking methods involve displacing or rotating the mirror 3 and/or focussing lens 4 and, where necessary, displacing the stone 1 to compensate for any change in focal spot position; e.g. the mirror 3 can be reciprocated vertically, or in any suitable direction.

FIG. 4

Figure 4:
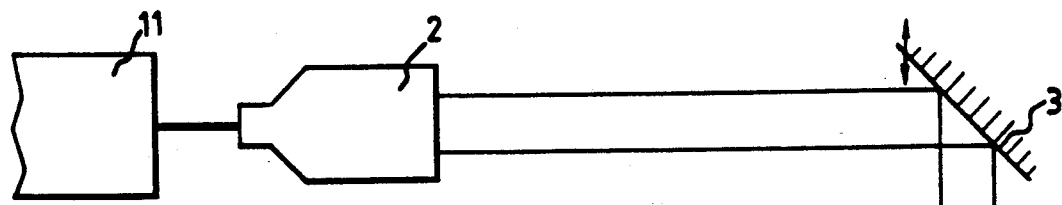
FIG. 4 is a schematic diagram of a practical embodiment.

FIG. 4 shows a laser 11, which can be a high power Q-switched YAG laser in fundamental $TEM_{oo}$ mode, which produces a beam having a Gaussian energy distribution and a very small focal spot. Other components are generally as illustrated in FIGS. 1-3, but the automatic positioning mechanism or "work-handling" 12 is shown, the diamond 1 (not shown) being mounted on the work-handling 12. The work-handling 12 can move the diamond 1 along x and y axes for benching out, and the lens 4 is movable along the z axis for focussing. These movements are carried out automatically in a known manner. The mirror 3 is in this case represented as being moveable in a vertical direction.

Figure 5A:
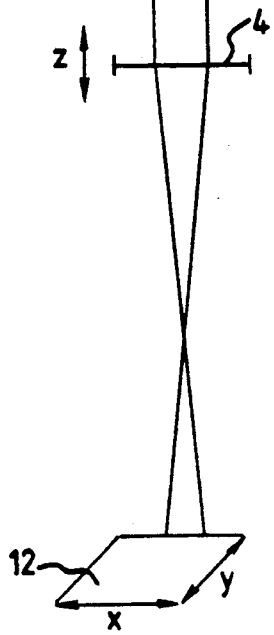
FIGS. 5a, 5b and 5c illustrate an advantage of the invention.
Figure 5A:
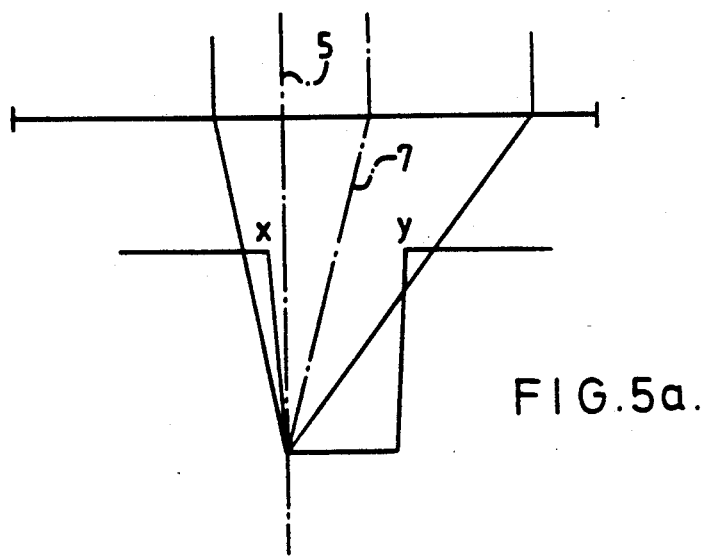
Figure 5B:
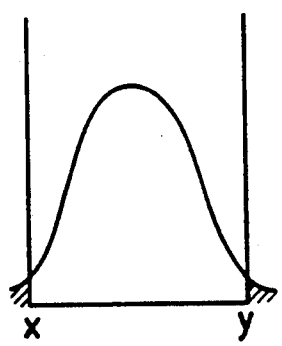
Figure 5C:
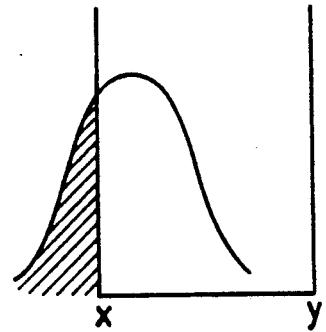

FIGS. 5a-5c

FIG. 5a illustrates the vignetting which occurs with the invention, and FIG. 5b gives the corresponding energy distribution graph, the shaded portions representing energy which is not available for cutting (the energy is the area under the graph). FIG. 5c illustrates the corresponding graph when the side of the cut is machined without rocking or swinging in accordance with the invention.

Figure 6A:
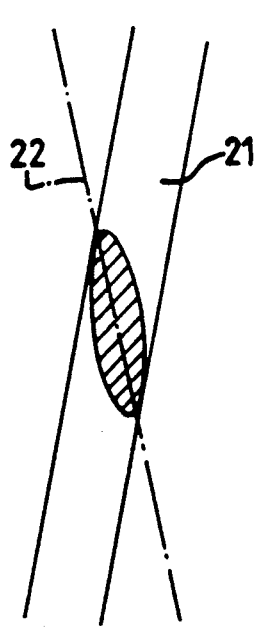
FIGS. 6a and 6b illustrate another advantage of the invention.
Figure 6B:
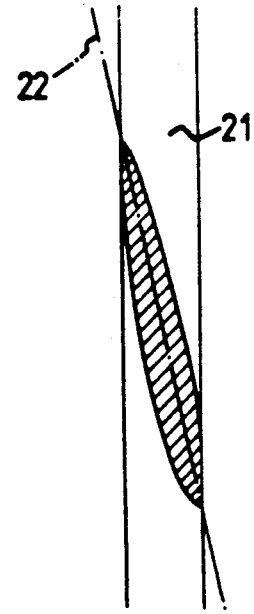

FIGS. 6a AND 6b

FIG. 6a illustrates that the invention increases the angle between the incident beam 21 and the side wall 22 of the cut, and thus reduces the projected size of the focal spot and increases the energy density. FIG. 6b illustrates the same situation without swinging or rocking.

The present invention has been described above purely by way of example, and modifications can be made within the spirit of the invention.

I claim:

1. A method of making a cut using high energy radiation, wherein the incident radiation is focussed substantially on the base of the cut and the focus is altered as the cut deepens to keep the incident radiation focussed substantially on the base of the cut, wherein the axis of the incident radiation relative to the cut is moved repeatedly from a position in which it is directed towards a first side of the cut and is inclined towards the other, second side of the cut to a position in which it is directed towards the second side of the cut and is inclined towards the first side of the cut, and back again.

2. The method of claim 1, wherein the axis of the incident radiation is oscillated, whilst the workpiece is moved to and fro transversely.

3. The method of claim 1, wherein the axis of the incident radiation is oscillated about the focal point.

4. The method of claim 2, wherein the radiation is focussed onto the workpiece using stationary lens means.

5. The method of claim 3, wherein the radiation is focussed onto the workpiece using stationary lens means.

6. The method of claim 2, wherein in order to change the axis of the incident radiation, the beam entering the rear of the focussing lens is translated so that it passes other than through the center of the lens.

7. The method of claim 3, wherein in order to change the axis of the incident radiation, the beam entering the rear of the focussing lens is translated so that it passes other than through the center of the lens.

8. The method of claim 4, wherein in order to change the axis of the incident radiation, the beam entering the rear of the focussing lens is translated so that it passes other than through the center of the lens.

9. Apparatus for making a cut using high energy radiation, the apparatus comprising means for focussing the incident radiation substantially on the base of the cut and for altering the focus as the cut deepens to keep the incident radiation focussed substantially on the base of the cut, and means for moving the axis of incident radiation relative to the cut from a position in which it is directed towards a first side of the cut and is inclined towards the other, second side of the cut to a position in which it is directed towards the second side of the cut and is inclined towards the first side of the cut, and back again.

10. The apparatus of claim 9, and comprising a mount for holding a workpiece, which mount is reciprocable continuously transversely of the cut, a stationary lens means for focussing the radiation onto the workpiece, and means for translating the axis of the beam entering the lens means in the same direction as the workpiece.

11. The apparatus of claim 10, wherein the beam translating means comprises a reciprocable mirror on the side of the lens means away from the workpiece.

* * * * *